(12) United States Patent
Suzuyama et al.

(10) Patent No.: US 8,479,621 B2
(45) Date of Patent: Jul. 9, 2013

(54) INTERNAL MACHINING APPARATUS FOR HOLLOW WORKPIECE

(75) Inventors: Shigefumi Suzuyama, Chiryu (JP); Gen Ogawa, Okazaki (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 281 days.

(21) Appl. No.: 13/089,667

(22) Filed: Apr. 19, 2011

(65) Prior Publication Data

US 2011/0265615 A1 Nov. 3, 2011

(30) Foreign Application Priority Data

Apr. 28, 2010 (JP) .................................. 2010-103716

(51) Int. Cl.
*B23B 5/40* (2006.01)
(52) U.S. Cl.
USPC ..................... 82/1.5; 82/1.2; 82/1.4; 409/143
(58) Field of Classification Search
CPC ............ B23B 5/40; B23B 29/034; B23B 41/12
USPC .............. 82/1.2, 1.4, 1.5, 131; 409/143, 165; 408/173, 178, 153; 29/27 C, 27 R
See application file for complete search history.

(56) References Cited

U.S. PATENT DOCUMENTS

| | | | | |
|---|---|---|---|---|
| 2,372,913 A | * | 4/1945 | Schmidt ........................ | 409/143 |
| 3,315,549 A | * | 4/1967 | Malschner ..................... | 82/1.5 |
| 4,023,451 A | * | 5/1977 | Acton et al. .................... | 82/1.5 |
| 4,176,565 A | * | 12/1979 | Christoph ....................... | 82/12 |
| 2010/0257980 A1 | * | 10/2010 | Hyatt et al. .................... | 82/1.11 |

FOREIGN PATENT DOCUMENTS

JP 2006-272468 10/2006

* cited by examiner

*Primary Examiner* — Andrea Wellington
*Assistant Examiner* — Ryan Rufo
(74) *Attorney, Agent, or Firm* — Oblon, Spivak, McClelland, Maier & Neustadt, L.L.P.

(57) ABSTRACT

In an internal machining apparatus for machining an internal surface of a hollow workpiece, a machining unit holding a cutting blade is configured to be inserted into the hollow workpiece. A pair of unit holding arbors which are capable of non-rotatably holding the machining unit, inserted in the hollow workpiece, at both sides thereof are respectively supported by a work head and a foot stock to advance and retract in an axial direction thereof. A turning mechanism is provided to be supplied with a drive power transmitted through the interior of one of the unit holding arbors for turning the cutting blade held on the machining unit about an axis orthogonal to an axis of the unit holding arbors.

7 Claims, 6 Drawing Sheets

FIG. 10 though # US 8,479,621 B2

INTERNAL MACHINING APPARATUS FOR HOLLOW WORKPIECE

INCORPORATION BY REFERENCE

This application is based on and claims priority under 35 U.S.C. 119 with respect to Japanese Application No. 2010-103716 filed on Apr. 28, 2010, the entire content of which is incorporated herein by reference.

BACKGROUND OF THE INVENTION

1. Field of the Invention

The present invention relates to an internal machining apparatus for a hollow workpiece which spherically machines an interior spherical surface of a hollow workpiece such as differential case.

2. Discussion of the Related Art

For example, in an automotive differential case for housing a differential gear mechanism, it is required to precisely machine an interior spherical surface which contacts respective back surfaces of a pair of pinion gears meshing with a pair of side gears. Particularly, in an integral-type differential case which takes a hollow interior shape, because it is difficult to insert a cutter attached on a tool spindle from the outside of the differential case and to machine the interior spherical surface, it is practiced as described in, for example, JP2006-272468 A to machine interior flat surfaces and an interior spherical surface by successively inserting, one at a time, a plurality of machining units each with a cutting blade, by non-rotatably holding each of these machining units by a pair of unit holding arbors, and by moving the cutting blade in predetermined directions through rotation of a rotational drive member passing through one of the unit holding arbors.

That is, in the internal machining apparatus described in the aforementioned Japanese published application, where the interior spherical surface is to be machined, the cutting blade is moved along a spherical surface by a two-axis simultaneous control of axial-direction moving means for axially moving a machining unit by the cooperation of the pair of unit holding arbors and radial-direction moving means for radially moving the cutting blade held on the machining unit by the rotation of the rotational drive member passing through one of the unit holding arbors.

The internal machining apparatus described in the aforementioned Japanese published application features that the interior flat surfaces and the interior spherical surface can be machined on a single machining apparatus through exchanges of the machining units. However, by the two-axis simultaneous control of the axial-direction moving means for axially moving the machining unit and the radial-direction moving means for radially moving the cutting blade held on the machining unit, the cutting blade is moved along a spherical surface to spherically machine the interior spherical surface of the differential case. Thus, errors in locus arise when quadrants are switched to cause each axis to reverse the direction of motion, and also arise due to the adverse influence of friction force which results from the fact that the movement of the cutting blade depends on a motion conversion performed by an engaging hole and a cam follower, and therefore, a problem arises in that the application is difficult to workpieces on which the machining accuracy (e.g., sphericity) of the spherical surface is required to be strict.

SUMMARY OF THE INVENTION

Accordingly, it is an object of the present invention to provide an improved internal machining apparatus which is capable of precisely machining an interior spherical surface by turning a cutting blade provided on a machining unit.

Briefly, according to the present invention, there is provided an improved internal machining apparatus for machining an internal surface of a hollow workpiece. The apparatus comprises a work head rotatably supporting a work spindle for rotationally driving the hollow workpiece; a foot stock provided to face the work head; and a machining unit holding a cutting blade and configured to be inserted into the hollow workpiece. A pair of unit holding arbors are respectively supported by the work head and the foot stock to advance and retract in an axial direction thereof and are capable of non-rotatably holding the machining unit inserted in the hollow workpiece at both sides thereof. A turning mechanism is further provided and is configured to be supplied with a drive power transmitted through the interior of one of the unit holding arbors for turning the cutting blade held on the machining unit about an axis orthogonal to an axis of the unit holding arbors.

With this construction, the internal machining apparatus is constructed by the work head rotatably supporting the work spindle for rotationally driving the hollow workpiece, the foot stock provided to face the work head, the machining unit holding the cutting blade and configured to be inserted into the hollow workpiece, the pair of unit holding arbors respectively supported by the work head and the foot stock to advance and retract in the axial direction thereof and being capable of non-rotatably holding the machining unit inserted in the hollow workpiece at both sides thereof, and the turning mechanism configured to be supplied with a drive power transmitted through the interior of one of the unit holding arbors for turning the cutting blade held on the machining unit about an axis orthogonal to the axis of the unit holding arbors. Thus, in the apparatus, it is unnecessary to move the cutting blade along an arc motion by performing simultaneous controls in the axial direction and the radial direction as is done in the prior art apparatus, but it is possible to perform a precise spherical machining on the internal surface of the hollow workpiece by turning the cutting blade.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Hereafter, embodiments according to the present invention will be described with reference to the accompanying drawings. First of all, the shape of a hollow workpiece to be machined, that is, a differential case W will be described with reference to FIGS. 2 and 3. In the differential case W, there are formed to pass therethrough concentric support holes W11, W12 for respectively supporting a pair of side gears, concentric support holes W13, W14 for respectively supporting a pair of pinion gears which are to respectively mesh with the respective side gears, and opening windows W 31, W32 provided in a direction orthogonal to the support holes W13, W14 for use in assembling the side gears and the pinion gears therein. The internal machining apparatus in the present embodiments is constructed to spherically machine arc-shape interior spherical surfaces W1, W2 of the aforementioned differential case W which are to slidably contact back surfaces of the respective pinion gears, and also to flatten internal flat surfaces W3, W4 which are to slidably contact back surfaces of the respective side gears.

Figure 3:
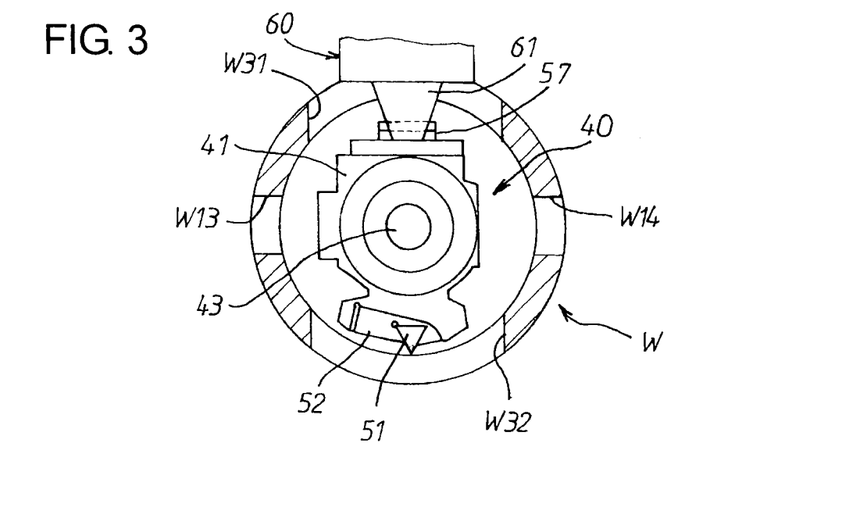
FIG. 3 is a cross-sectional view showing the state that a machining unit is inserted by a unit supply device into a hollow workpiece.

As described later, the differential case W is positioned and clamped by a positioning pin and a clamping device so that the center or axis of the support holes W11, W12 is aligned with a work spindle center or axis, and the arc-shape interior curved surfaces W1, W2 which are to slidably contact the back surfaces of the respective pinion gears are spherically machined. For convenience, FIG. 3 shows the state that a machining unit 40, referred to later, has been inserted by a unit supply device 60, referred to later, in the differential case W.

(First Embodiment)

Figure 1:
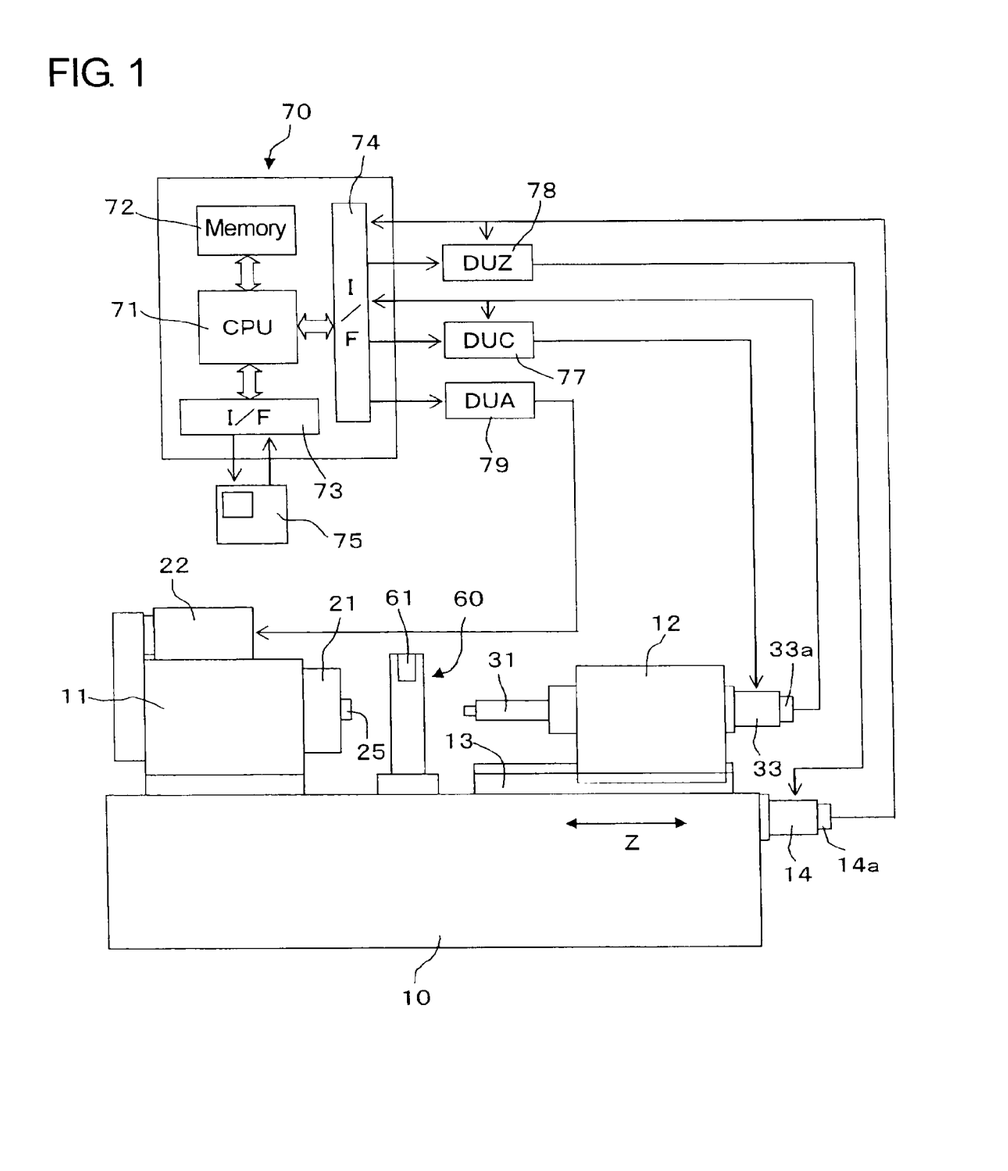
FIG. 1 is a general view showing an internal machining apparatus for hollow workpiece preferred in practicing the present invention.

FIG. 1 shows the whole of an internal machining apparatus in a first embodiment according to the present invention. Numeral 10 denotes a bed, and a work head 11 and a foot stock 12 are mounted on the bed 10 to face each other. The work head 11 is fixed on the bed 10, while the foot stock 12 is mounted to be advanced and retracted in a Z-axis direction along a guide base 13 provided on the bed 10. The foot stock 12 is moved back and forth by a servomotor 14 through a ball screw (not shown) in the Z-axis direction, and the moving amount is detected by an encoder 14a connected to the servomotor 14.

Figure 2:
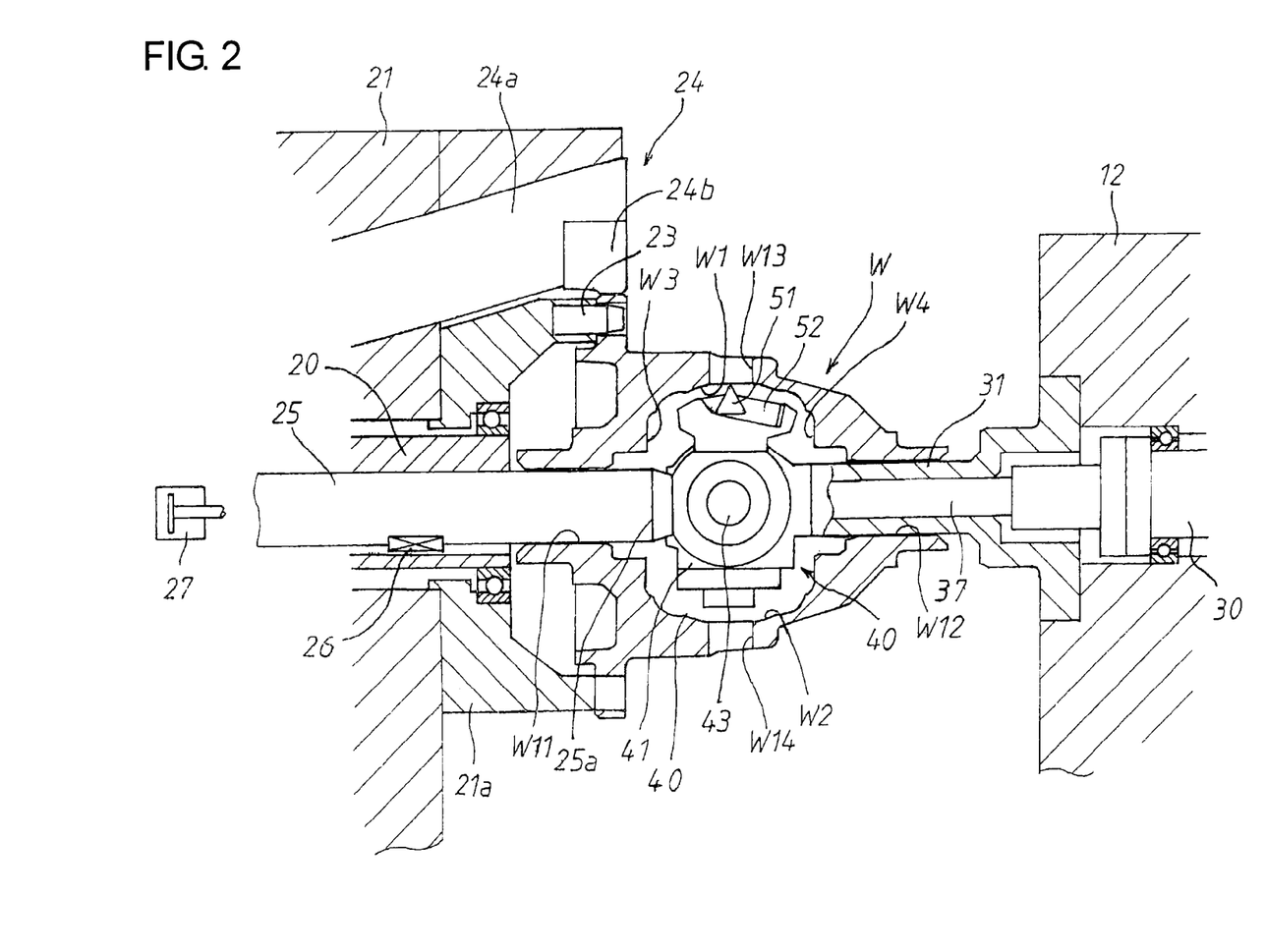
FIG. 2 is a longitudinal sectional view showing the internal machining apparatus in a first embodiment according to the present invention.

As shown in FIG. 2, a stationary shaft 20 is secured in the work head 11 in parallel to the Z-axis direction. A cylindrical work spindle 21 is rotatably supported around the circumferential surface of the stationary shaft 20 and is drivingly rotatable by a spindle drive motor 22. A spindle face plate 21a is attached to an extreme end portion of the work spindle 21, and the differential case W is positioned by a positioning pin 23 in the rotational direction and is clamped by a pin arbor chuck 24 on the spindle face plate 21a. As well-known in the art, in the pin arbor chuck 24, a plurality (e.g., three in this particular embodiment) of pin arbors 24a arranged in the circumferential direction are provided movably in oblique directions, and with movements of these pin arbors 24a, chuck jaws 24b attached to extreme ends of the pin arbors 24a clamp the differential case W as they press a circumferential part of the differential case W on a reference surface of the spindle face plate 21a. In a modified form, a clamping device in a different construction such as three-jaw chuck or the like may be utilized as the chuck 24.

A unit holding arbor 25 passes through the center portion of the stationary shaft 20 and is movable in the axial direction only by being restrained with a key member 26. The unit holding arbor 25 is axially movable back and forth by an arbor advance/retraction cylinder 27 which is mounted at a rear part of the stationary shaft 20. The unit holding arbor 25 also passes through the support hole W11 of the differential case W to extend its extreme end to a hollow portion in the differential case W. A taper surface 25a which is able to fit in a unit body of the machining unit 40 as referred to later is formed at the extreme end of the unit holding arbor 25.

At an extreme end of the foot stock 12, a cylindrical unit holding arbor 31 is fixed in a concentric relation with the unit holding arbor 25, and the unit holding arbor 31 passes through the support hole W12 of the differential case W to extend its extreme end to the hollow portion in the differential case W. A taper hole 31a which is able to fit with the unit body of the machining unit 40 as referred to later is formed at the extreme end of the unit holding arbor 31, and an engaging claw portion 31b which is engageable with the unit body of the machining unit 40 is formed on an internal surface of the taper hole 31a.

Further, a drive spindle 30 is rotatably supported in the foot stock 12, and the drive spindle 30 is coupled to a servomotor 33 (refer to FIG. 1) mounted on the foot stock 12. On an extreme end of the drive spindle 30, a rotational drive member 37 is supported not to be rotatable but to be relatively movable by a predetermined amount in the axial direction. The rotational drive member 37 which transmits a rotational drive power of the drive spindle 30 through the interior of the unit holding arbor 31 passes through the unit holding arbor 31 to protrude its extreme end beyond the unit holding arbor 31 and has a key engaging portion 37a formed at a protruding end. The rotational drive member 37 is always urged in a forward direction by the resilient force of a spring (not shown) provided between itself and the drive spindle 30 and is usually held at an advanced end position.

In the construction as described above, when the servomotor 33 is driven, the rotational drive member 37 is rotated together with the drive spindle 30, and the rotational amount is detected by an encoder 33a connected to the servomotor 33.

Figure 4:
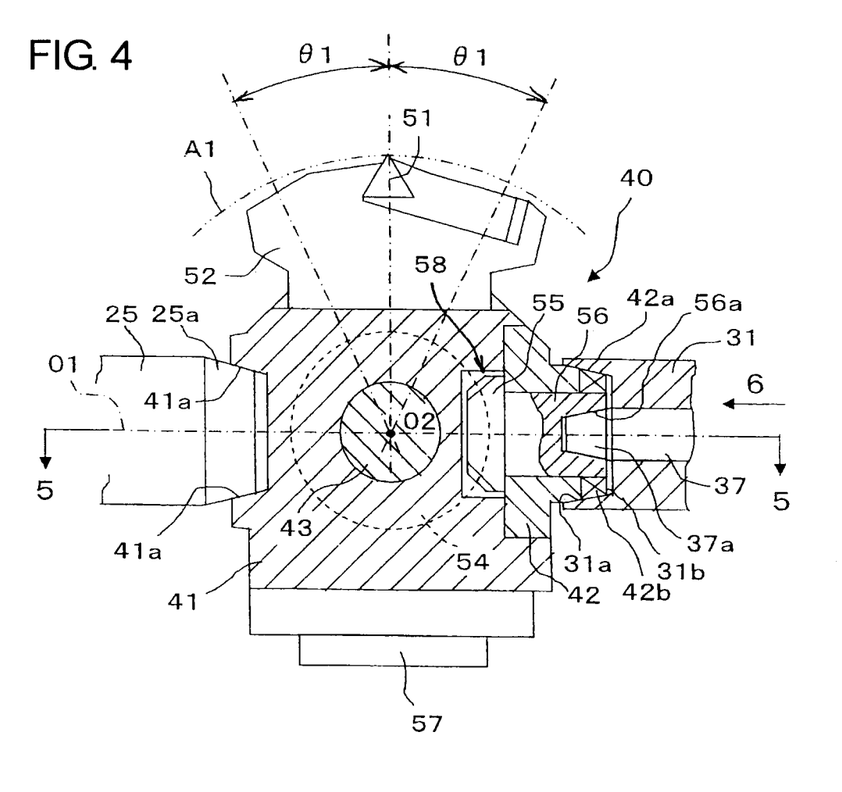
FIG. 4 is a fragmentary longitudinal sectional view showing, in an enlarged scale, an important part of the machining apparatus shown in FIG. 2.
Figure 5:
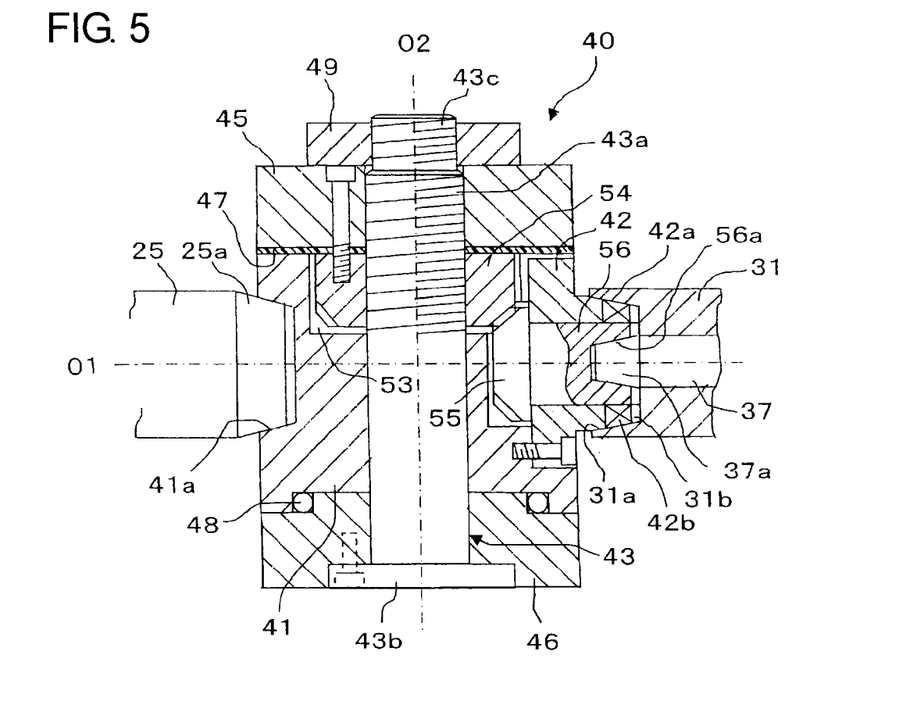
FIG. 5 is a fragmentary longitudinal sectional view of the machining unit taken along the line 5-5 in FIG. 4.
Figure 6:
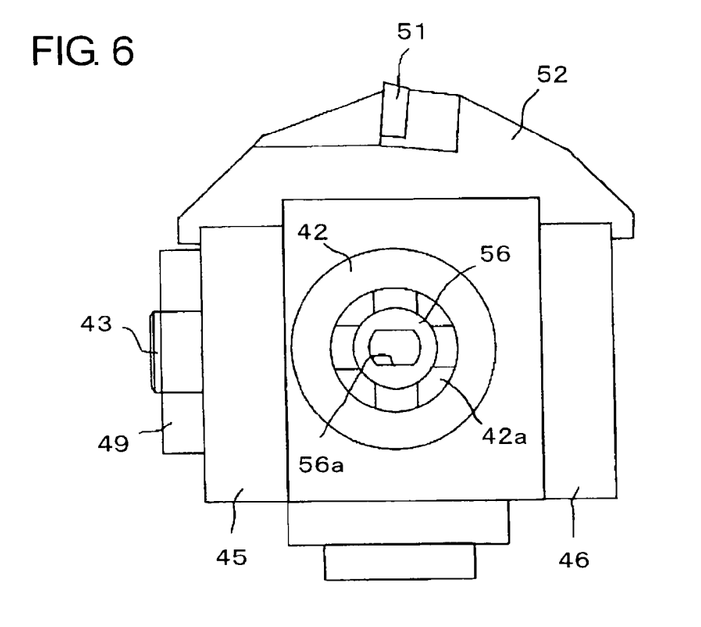
FIG. 6 is a side view of the machining unit as viewed from the arrow 6 in FIG. 4.

Reference numeral 40 designates the machining unit which, at the time of machining of the differential case W, is inserted into the hollow portion of the differential case W to spherically machine the interior curved surfaces W1, W2. As shown in FIGS. 4 through 6, the machining unit 40 is provided at one end on a center axis O1 of the unit body 41 with a taper hole 41a which is able to fit on the taper surface 25 formed on the extreme end of the unit holding arbor 25. On the other hand, the other end on the center axis O1 of the unit body 41 has an engaging member 42 secured thereto, and the engaging member 42 is formed with a taper surface 42a which is able to fit in the taper hole 31a formed on the extreme end of the unit holding arbor 31, and an engaging claw portion 42b which is able to be disengageably engaged with the engaging claw portion 31b formed on the taper hole 31a.

In the unit body 41, a rotational shaft 43 as pivot or turn center axis is supported rotatably about an axis O2 which intersects at right angles (i.e., extends orthogonal) to the center axis O1. A pair of rotary discs 45, 46 are attached to opposite end portions of the rotational shaft 43 with the unit body 41 put therebetween. One of the rotary discs 45 and one end (the upper surface as viewed in FIG. 3) of the unit body 41 are held in surface contact to be relatively rotatable through a thin antifriction member 47 (made of Turcite®, a material well known in the art) which is affixed to the rotary disc 45, whereas a thrust bearing 48 is interposed between the other rotary disc 46 and the other end (the lower surface as viewed in FIG. 3) of the unit body 41. Further, the one rotary disc 45 is screw-engaged with a screw portion 43a formed at one end portion of the rotational shaft 43, while the other rotary disc 46 is secured to a flange portion 43b formed on the other end of the rotational shaft 43.

Accordingly, by screwing up the one rotary disc 45, the pair of rotary discs 45, 46 are attached to pinch the unit body 41 from opposite sides (from the upper and lower sides in FIG. 5) through the antifriction member 47 and the thrust bearing 48. Numeral 49 denotes a lock nut screw-engaged with a locking screw portion 43c formed at an end portion of the rotational shaft 43, and the lock nut 49 is screwed up to be brought into pressure-contact with the rotary disc 45 to prevent the same from loosening. In this way, the pair of rotary discs 45, 46 are supported to be rotatably only about the axis O2 relative to the unit body 41.

A cutting blade unit 52 on which a cutting blade 51 is attached to be able to make a fine adjustment is secured to the pair of rotary discs 45, 46 as it spreads over the same to astride the unit body 41. With the rotation of the rotary discs 45, 46, the cutting blade 51 is turned along an arc locus A1 (refer to FIG. 4) having its center on the axis O2 and thus, it is possible to spherically machine the interior curved surfaces W1, W2 with the cutting blade 51.

An annular recess portion 53 is formed on the end surface of the unit body 41 which the rotary disc 45 is in surface contact with through the thin antifriction member 47. The recess portion 53 receives therein a driven bevel gear 54 fitted on the rotational shaft 43, and the driven bevel gear 54 is secured to the rotary disc 45. In the unit body 41, a shaft portion 56 of a drive bevel gear 55 which meshes with the driven bevel gear 54 is relatively rotatably fitted in an internal surface of the engaging member 42 and is supported rotatably only about the center axis O1. A taper-shape key way 56a which is able to be disengageably engaged with the key engaging portion 37a formed on the extreme end of the rotational drive member 37 is formed on an end surface of the shaft portion 56 of the drive bevel gear 55. The drive bevel gear 55 is received in a circular space (not numbered) which partly overlaps the annular recess portion 53. Numeral 57 in FIG. 4 denotes a gripped portion which is able to be gripped by a pair of unit grip fingers (collectively designated as 61 in FIGS. 1 and 3) of the unit supply device 60 referred to later.

The drive spindle 30, the rotational drive member 37, the drive bevel gear 55, the driven bevel gear 54 meshing with the drive bevel gear 55, the rotational shaft 43, the rotary discs 45, 46 and the like which are rotationally driven by the aforementioned servomotor 33 constitute a turning mechanism 58 (refer to FIG. 4) for turning the cutting blade 51 about the center (the axis O2) of the rotational shaft 43 which is orthogonal to the center axis O1.

The machining unit 40 for machining the interior curved surfaces W1, W2 is gripped at its gripped portion 57 by the unit grip fingers 61 of the unit supply device 60 which comprises, for example, a robot or the like installed on the bed 10, and is inserted in the inside of the differential case W through the opening window W31 (or W32) of the differential case W.

Next, a numerical controller 70 will be described. In FIG. 1, the numerical controller 70 is composed of a central processing unit (CPU) 71, a memory 72 and interfaces (I/F) 73, 74. The interface (I/F) 73 is connected to an input/output device 75 for inputting control parameters and numerical control (NC) programs which are required for numerical control operations.

Further, the interface (I/F) 74 is connected to servomotor drive units (DUC, DUZ) 77, 78 and a spindle drive unit (DUA) 79. The servomotor drive units (DUC, DUZ) 77, 78 and the spindle drive unit (DUA) 79 drive the respective servomotors 33, 14 and the spindle drive motor 22 when receiving commands from the central processing unit 71.

The memory 72 is provided with storage areas which respectively store the control parameters and the NC programs. The servomotors 14, 33 are controlled based on deviations or differences between target position commands of the NC programs stored in the memory 72 and present position signals supplied from the encoders 14a, 33a and control the positioning of the foot stock 12 to a target position in the Z-axis direction and also controls the turning (pivot movement) of the tool shank 52 within a predetermined angular range about the axis O2.

Hereinafter, the operation of the first embodiment as constructed above will be described. The differential case W is transferred by hand or automatically by a loading device (not shown) onto the extreme end surface of the spindle face plate 21a as the support hole W11 lets the unit holding arbor 25 go therethrough, and is positioned and clamped by the positioning pin 23 and the pin arbor chuck 24 on the extreme end surface of the spindle face plate 21a. In this state, the machining unit 40 for machining the interior spherical surfaces (curved surfaces) W1, W2 is gripped at its gripped portion 57 by the unit grip fingers 61 of the unit supply device 60, is inserted into the differential case W through the opening window W31 of the differential case W as shown in FIG. 3, and is positioned to bring the center axis O1 thereof into alignment with the axis of the unit holding arbors 25, 31.

Then, the servomotor 14 is driven in accordance with a numerical control (NC) command to advance the foot stock 12 through the ball screw (not shown). Thus, the unit holding arbor 31 goes to pass through the support hole W12 of the differential case W. This enables the taper hole 31a at the extreme end of the unit holding arbor 31 to fit on the taper surface 42a of the engaging member 42 secured to the unit body 41 and also enables the engaging claw portion 31b of the unit holding arbor 31 to engage with the engaging claw portion 42b of the engaging member 42, so that the relative rotation therebetween can be prevented. At the same time, the key engaging portion 37a formed at the extreme end of the rotational drive member 37 passing through the unit holding arbor 31 is brought into engagement with the key way 56a on the shaft portion 56 of the drive bevel gear 55. At this time, although a situation may occur that the key engaging portion 37a of the rotational drive member 37 does not correctly engage with the key way 56a of the shaft portion 56, the subsequent rotation of the rotational drive member 37 will ensure that the key engaging portion 37a is reliably brought into correct engagement with the key way 56a by the aid of the resilient force of the spring (not shown) acting on the rotational drive member 37.

In this way, after the foot stock 12 is advanced to a set position, the unit holding arbor 25 is then advanced by the arbor advance/retraction cylinder 27 to bring the taper surface 25a at the extreme end thereof into fitting engagement with the taper hole 41a of the unit body 41, whereby the unit body 41 is pressed on the unit holding arbor 31. As a result, the unit body 41 is pinched and supported by the unit holding arbors 25, 31 at both ends thereof to be centered or held concentrically therewith and is prevented from being rotated.

After the both ends of the unit body 41 are pinched and supported by the unit holding arbors 25, 31, the unit grip fingers 61 are opened to release the machining unit 40, and the unit supply device 60 is evacuated with the machining unit 40 remaining left in the inside of the differential case W. In this state called "original state" for convenience, the cutting blade 51 of the machining unit 40 is held at an angular position where it faces the support hole W13 of the differential case W, as shown in FIG. 2, and in this state, the work spindle 21 is rotationally driven by the spindle drive motor 22 to rotate the differential case W. At the same time, in accordance with an NC command, the servomotor 33 is driven at a predetermined rotational speed in a positive-going direction to rotate the drive spindle 30 in one direction. Thus, the drive bevel gear 55 supported in the unit body 41 is rotated through the rotational drive member 37, and the pair of rotational discs 45, 46 are turned together with the rotational shaft 43 through the driven bevel gear 54.

With the turning or the pivot movement of the rotational discs 45, 46, the cutting blade unit 52 which is secured to the rotational discs 45, 46 to spread over the same is turned about the axis O2 in, for example, a clockwise direction as shown in FIG. 4 through a predetermined angle θ1, whereby the cutting blade 51 attached to the cutting blade unit 52 is moved along the arc locus A1 at a turn speed corresponding to the rotational speed of the servomotor 33. The half of the interior spherical surfaces W1, W2 (i.e., the right half W2 in FIG. 2) is spherically machined as a result of the cutting blade unit 52 being turned through the predetermined angle θ1. Subsequently, the servomotor 33 is driven in a reverse direction, and the drive spindle 30 is rotated in the other direction. Thus, the cutting blade unit 52 which is secured to the rotational discs 45, 46 to spread over the same is turned about the axis O2 in a counterclockwise direction as shown in FIG. 4 to goes back toward the original position shown in FIG. 4 and is further turned through a predetermined angle θ1 beyond the original position. As result, the remaining half of the interior spherical surfaces W1, W2 (i.e., the left half W1 in FIG. 2) is spherically machined.

When the spherical machining on the interior spherical surfaces W1, W2 is completed in this manner, the work spindle 21 is stopped at a predetermined angular position, the servomotor 33 is returned to the original position, and the unit supply device 60 is operated to make the unit grip fingers 61 grip the gripped portion 57 of the machining unit 40 which still remains in the inside of the differential case W. Then, the foot stock 12 and the unit holding arbor 25 are retracted to their original positions, and the machining unit 40 is taken out by the unit supply device 60 from the inside of the differential case W. Thereafter, the positioning and clamping of the differential case W on which the machining has been completed is released, and the differential case W is unloaded by hand or by the loading device (not shown).

Where another workpiece W whose interior spherical surfaces W1, W2 differ in diameter is to be machined, the adaptation to such machining is possible either by making the position adjustment of the cutting blade 51 in dependence on the diameters of the interior spherical surfaces to be machined or by using another machining unit which is particularly designed to machine the interior spherical surfaces which differ in diameter.

In the foregoing first embodiment, the machining unit 40 which is non-rotatably pinched at both sides thereof by the pair of unit holding arbors 25, 31 is provided with the rotational shaft 43 supported in the unit body 41 rotatably about the axis O2 orthogonal to the axis O1 of the unit holding arbors 25, 31 and holding the cutting blade unit 52 at the radial outer position of the machining unit 41 and is further provided with a drive bevel gear 55 meshing with the driven bevel gear 54 provided on the rotational shaft 43 and rotatably supported in the unit body 41 to be disengageably engaged with the rotational drive member 37 and to be driven by the same. Thus, when the rotational drive member 37 is rotated by the servomotor 33, the cutting blade 51 together with the rotational shaft 43 can be turned about the axis O2 through the drive bevel gear 55 and the driven bevel gear 54, so that it is possible to spherically machine the interior spherical surfaces W1, W2 of the workpiece W with the cutting blade 51. In this case, it does not occur to suffer from the adverse influences which result from switching quadrants or the like as is done in the prior art apparatus, and hence, it is possible to perform the spherical machining of the interior spherical surfaces W1, W2 precisely.

Further, in the foregoing first embodiment, the unit supply device 60 is provided which is capable of inserting the machining unit 40 gripped thereby into the inside of the hollow workpiece W and of being evacuated with the machining unit 40 remaining left in the inside of the hollow workpiece W prior to the machining of the hollow workpiece W. Thus, it is possible to automatically pinch and support the machining unit 40 between the pair of unit holding arbors 25, 31. This advantageously results in performing the replacement of the machining unit 40 easily and promptly and hence, in enhancing the machining efficiency.

Additionally, in the foregoing first embodiment, the first and second rotational discs 45, 46 are respectively attached to the both ends of the rotational shaft 43 passing through the unit body 41, the cutting blade unit 52 is attached to the external surfaces of these first and second rotational discs 45, 46 to spread over the same, and the driven bevel gear 54 is received in the recess portion 53 which is defined by the unit body 41 and the rotational disc 45, while the drive bevel gear 55 is received in the circular space (not numbered) which is defined by the unit body 41 and the engaging member 42. Thus, cutting chips and dusts are prevented from entering the inside of the machining unit 40, so that it is possible to perform the spherical machining precisely and stably over the long term.

(Second Embodiment)

Figure 7:
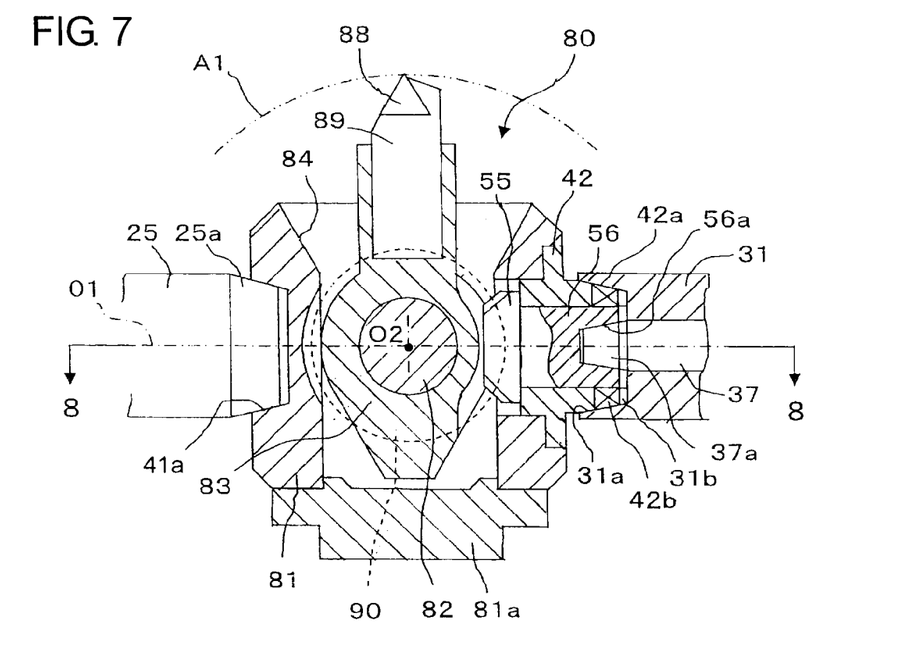
FIG. 7 is a fragmentary longitudinal sectional view showing an important part of the machining unit in a second embodiment according to the present invention.
Figure 8:
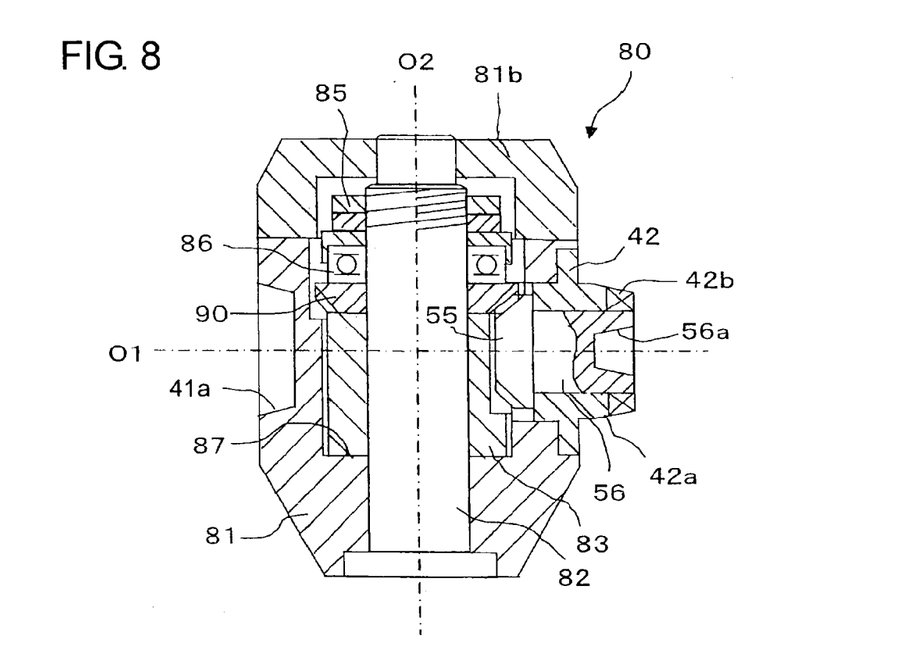
FIG. 8 is a longitudinal sectional view of the machining unit taken along the line 8-8 in FIG. 7.

FIGS. 7 and 8 show a second embodiment according to the present invention. The second embodiment differs from the foregoing first embodiment in that the machining unit is simplified in construction. The same components as those in the foregoing first embodiment will be designated by the same reference numerals and hence, will be omitted from description.

Referring to FIGS. 7 and 8, in a unit body 81 of a machining unit 80 whose both ends are held by the unit holding arbors 25, 31, a support shaft 82 as a turn center axis is provided on the axis O2 orthogonal to the center axis O1, and a tool holder 83 is pivotably fitted on the support shaft 82. A part on the circumferential surface of the tool holder 83 extends radially to project outside of the unit body 81 from an opening portion 84 formed on the unit body 81. A fastening nut 85 is screw-fixed at one end of the support shaft 82, and by screwing up the fastening nut 85, the tool holder 83 is pressed on a sliding surface 87 of the unit body 81 through a thrust bearing 86 and a driven bevel gear 90, referred to later, to be able to rotate only.

A tool shank 89 with a cutting blade 88 attached thereto is secured to an extreme end in the radial direction of the tool holder 83. The tool holder 83 has secured thereto the driven bevel gear 90 which is rotatably fitted on the support shaft 82, and the drive bevel gear 55 driven by the rotational drive member 37 meshes with the driven bevel gear 90. Numeral 81a in FIG. 7 denotes a gripped portion to be gripped by the unit grip fingers 61 of the unit supply device 60, and the gripped portion 81a is secured to the unit body 81 to close one end of the opening portion 84. Further, numeral 81b denotes a support block supporting one end of the support shaft 82, and the support block 81b is secured to the unit body 81.

With this construction, when upon driving of the servomotor 33, the rotational drive member 37 is rotated together with the drive spindle 30 through a predetermined angle in the same manner as described in the foregoing first embodiment, the tool holder 83 is turned about the axis O2 through the drive bevel gear 55 and the driven bevel gear 90, and the cutting blade 88 is moved along an arc locus A1 having its center on the axis O2, whereby the interior spherical surfaces W1, W2 are machined spherically.

According to the machining unit 80 in the second embodiment, it is possible to simply the unit 80 in construction in comparison with the machining unit 40 described in the foregoing first embodiment. In the machining unit 80 in the second embodiment, an anxiety arises in that cutting chips generated in machining the interior spherical surfaces W1, W2 enter the meshing part of the driven bevel gear 90 and the drive bevel gear 55 by way of the opening portion 84 of the unit body 81. However, the entering of the cutting chips can be prevented by providing a cover which closes the opening portion 84 by, for example, slidably overlapping the opening portion 84.

(Third Embodiment)

Figure 9:
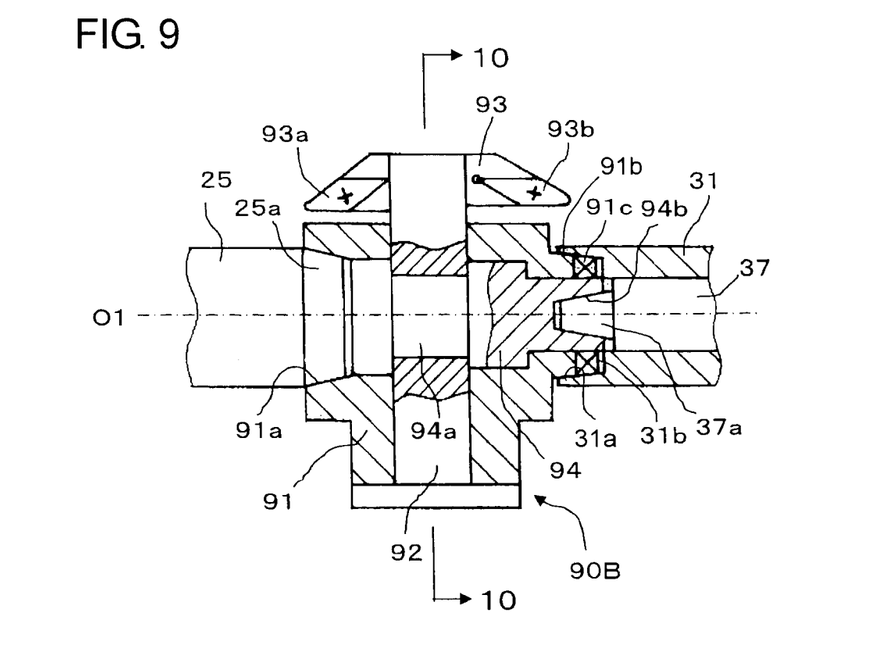
FIG. 9 is a fragmentary longitudinal sectional view showing an important part of the machining unit in a third embodiment according to the present invention.
Figure 10:
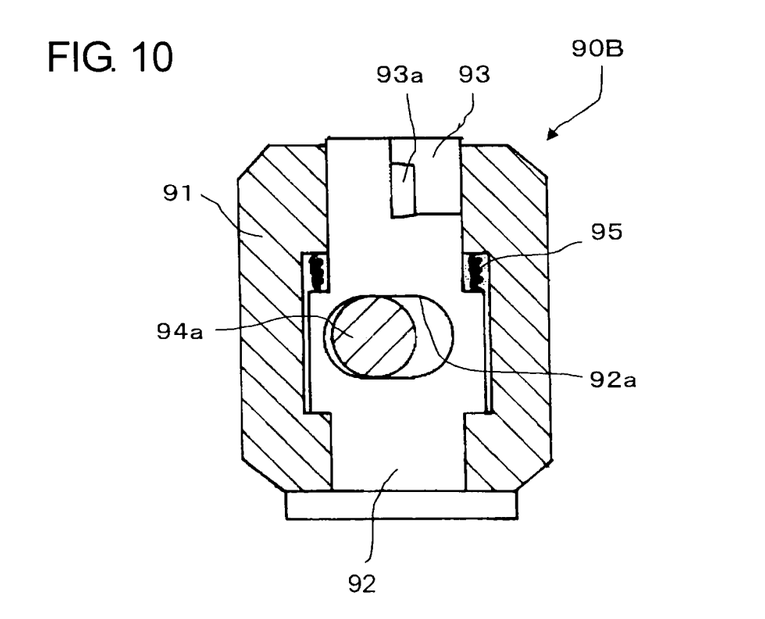
FIG. 10 is a cross-sectional view of the machining unit taken along the line 10-10 in FIG. 9.

Next, a third embodiment according to the present invention will be described with reference to FIGS. 9 and 10. In the third embodiment, it can be realized to successively machine the interior spherical surfaces W1, W2 and interior flat surfaces W3, W4 of the differential case W by using machining units (first and second machining units) 90A, 90B of two kinds one at a time. The first machining unit 90A for machining the interior spherical surfaces W1, W2 is identical to the machining unit 40 described in the foregoing first embodiment and hence, will be omitted from illustration. Hereafter, the second machining unit 90B for machining the interior flat surfaces W3, W4 will be described with reference to FIGS. 9 and 10.

In a unit body 91 of the second machining unit 90B, a taper hole 91a which is engageable with the taper surface 25a formed on the extreme end of the unit holding arbor 25 is formed at one end on the center axis O1. On the other end of the center axis O1 of the unit body 91, there are formed a taper surface 91b which is able to fit in the taper hole 31a formed at the extreme end of the unit holding arbor 31, and an engaging claw portion 91c which is able to be disengageably engaged with the engaging portion 31b formed on the interior of the extreme end of the unit holding arbor 31. The unit body 91 radially movably holds a tool shank 92, and one end of the tool shank 92 projects outside of the unit body 91. The one end of the tool shank 92 has fixed thereto a tip holder 93 which attaches throw-away tips at both ends thereof. The tip holder 93 is held to be eccentric from the center axis O1 radially of the unit body 91 and is able to successively perform turnings on the interior flat surfaces W3, W4 of the differential case W with the respective throw-away tips 93a, 93b when the tool shank 92 is moved radially of the unit body 91.

At the center portion of the unit body 91, an eccentric pin 94 passing through the tool shank 92 is rotatably received on the center axis O1. The eccentric pin 94 is provided with an eccentric portion 94a which is engaged with an engaging surface of an engaging hole 92a formed in the tool shank 92, and the tool shank 92 is radially movable when the rotation of the eccentric pin 94 brings about an arc motion of the eccentric portion 94a. Between the tool shank 92 and the unit body 91, a spring 95 is interposed, which urges the engaging surface of the engaging hole 92a always in contact with the eccentric portion 94a. One end of the eccentric pin 94 is formed with a taper key way 94b which is engageable with the key engaging portion 37a of the rotational drive member 37, so that the eccentric pin 94 is rotated upon rotation of the rotational drive member 37.

Accordingly, by rotationally driving the drive spindle 30 by the servomotor 33 in the same manner as described in the foregoing first embodiment, the eccentric pin 94 is rotated through the rotational drive member 37, and the tool shank 92 is linearly moved in the radial direction by the action of engagement between the eccentric pin 94 and the engaging hole 92a.

The servomotor 33, the driven spindle 30, the rotational drive member 37, the eccentric pin 94 and the like which have been all aforementioned constitute a radial moving mechanism for moving the tool shank 92 in the radial direction, and the servomotor 14, the ball screw (not shown), the foot stock 12, the unit holding arbor 31, the unit holding arbor 25, the arbor advance/retraction cylinder 27 and the like which have all been aforementioned constitute an axial moving mechanism for moving the machining unit 90B in the axial direction of the differential case W.

In the third embodiment, when the spherical machining by the use of the first machining unit 90A (identical to the unit 40 in the foregoing first embodiment) is completed on the interior spherical surfaces W1, W2 of the differential case W in the same manner as described in the foregoing first embodiment, the first machining unit 90A is taken out by the unit supply device 60 from the opening window W31 of the differential case W, after which the second machining unit 90B is loaded by the unit supply device 60 into the inside of the differential case W.

When the unit supply device 60 is evacuated following the loading of the second machining unit 90B into the inside of the differential case W, the work spindle 21 is driven by the spindle drive motor 22 to rotate the differential case W. At the same time, the servomotor 14 is driven in accordance with an NC command, and the foot stock 12 is advanced through a predetermined amount in the Z-axis direction (e.g., toward left in FIG. 2), whereby the throw-away tip 93a is infed against the interior flat surface W3 on one side. Then, the servomotor 33 is driven in accordance with an NC command and rotates the drive spindle 30 a predetermined amount at a predetermined speed. Thus, the eccentric pin 94 is turned by the rotational drive member 37 through the predetermined angle, and the tool shank 92 is moved a predetermined amount at a predetermined speed in the radial direction, whereby the turning of the interior flat surface W3 is performed with the throw-away tip 93a on one side.

When the turning of the interior flat surface W3 is completed, the servomotor 14 is driven in the opposite direction in accordance with an NC command. This causes the foot stock 12 to be moved by a programmed distance in the right direction in FIG. 2, whereby the throw-away tip 93b on the other side is infed against the other interior flat surface W4. Then, in the same way as mentioned above, the drive spindle 30 is driven by the servomotor 33 to move the tool shank 92 in the radial direction through the rotational drive member 37 and the eccentric pin 94, whereby the turning of the other interior flat surface W4 is performed with the throw-away tip 93b on the other side.

With the movement of the foot stock 12 and the unit holding arbor 31 in the Z-axis direction, the unit holding arbor 25 is moved against the arbor advance/retraction cylinder 27 or is moved by the arbor advance/retraction cylinder 27 to follow the unit holding arbor 31, so that it is possible to stably hold the second machining unit 90B at both ends of the same.

In a modified form of the third embodiment, the pair of interior flat surfaces W3, W4 may first be machined by the second machining unit 90B, and thereafter, the interior spherical surfaces W1, W2 may be machined by the first machining unit 90A (i.e., 40).

In the foregoing first and second embodiments, by transmitting the rotation of the rotational drive member 37 to the turn center shaft (i.e., the rotational shaft, the support shaft) 43, 82 through the drive bevel gear 55 and the driven bevel gear 54, 90, the cutting blade 51, 88 is turned about the turn center shaft 43, 82. Instead of the drive bevel gear 55 and the driven bevel gear 54, 90, however, there may be provided a worm reduction mechanism which comprises a worm shaft and a worm wheel meshing therewith, or a lead groove mechanism which comprises a lead groove and a cam follower engaged therewith.

The internal machining apparatus according to the present invention is suitable for use in performing spherical machining on an interior spherical surface of a hollow workpiece such as differential case W.

Various features and many of the attendant advantages in the foregoing embodiments will be summarized as follows:

In each of the foregoing first to third embodiments typically shown in FIGS. 1, 2, 4 and 7, the internal machining apparatus is constructed by the work head 11 rotatably supporting the work spindle 21 for rotationally driving the hollow workpiece W; the foot stock 12 provided to face the work head 11; the machining unit 40, 80 holding the cutting blade 51, 88 and configured to be inserted into the hollow workpiece W; the pair of unit holding arbors 25, 31 respectively supported by the work head 11 and the foot stock 12 to advance and retract in the axial direction thereof and being capable of non-rotatably holding the machining unit 40, 80, which is inserted in the hollow workpiece W, at both sides thereof; and the turning mechanism 58 configured to be supplied with a drive power transmitted through the interior of one of the unit holding arbors 31 for turning the cutting blade 51, 88 held on the machining unit 40, 80 about the axis O2 orthogonal to the axis O1 of the unit holding arbors 25, 31. Thus, in the apparatus, it is unnecessary to move the cutting blade 51, 88 along an arc motion by performing simultaneous controls in the axial direction and the radial direction as is done in the prior art apparatus, but it is possible to perform a precise spherical machining on the internal surface W1 (or W2) of the hollow workpiece W by turning the cutting blade 51, 88 about the axis O2.

Also in each of the foregoing first to third embodiments typically shown in FIGS. 1-3 and 7, the unit supply device 60 is configured to insert the machining unit 40, 80 gripped thereby into the hollow workpiece W and to be evacuated with the machining unit 40, 80 remaining left in the hollow workpiece W prior to a machining of the hollow workpiece W. Thus, it is possible to automatically pinch the machining unit 40, 80 between the pair of unit holding arbors 25, 31, and hence, it becomes possible to replace the machining unit 40, 80 easily and promptly, so that the machining efficiency can be enhanced.

Also in each of the foregoing first to third embodiments typically shown in FIGS. 1, 2, 4 and 7, the machining unit 40, 80 comprises the unit body 41, 81 configured to be non-rotatably held by the pair of unit holding arbors 25, 31; the turn center shaft 43, 82 supported in the unit body 41, 81 to be rotatable about the axis O2 orthogonal to the axis O1 of the unit holding arbors 25, 31 and holding the cutting blade 51, 88; and the driven member 56 (i.e., the shaft portion 56 of the drive bevel gear 55) rotatably supported in the machining unit 40, 80 and being drivingly connectable with the rotational drive member 37, which passes through one of the unit holding arbors 31, for transmitting rotation of the rotational drive member 37 to the turn center shaft 43, 82. Thus, it is possible to turn the cutting blade 51, 88 by rotating the rotational drive member 37 by the servomotor 33, and hence, it is possible to spherically machine the interior spherical surface W1 (or W2) with the cutting blade 51, 88. Accordingly, it can be realized to spherically machine the interior spherical surface W1 (or W2) precisely without suffering from the adverse influences which are exerted by switching quadrants as is done in the prior art apparatus.

Also in the third embodiment typically shown in FIGS. 2, 4, 9 and 10, two machining units 90A (40), 90B which respectively hold different cutting blades 51, 93a, 93b are used and are inserted successively one at a time into the hollow workpiece W to be used for the machining of the hollow workpiece W. Thus, for the machining on two places W1, W3 (or W2, W4) of the workpiece W which are located to be orthogonal to each other, it becomes possible to machine the two places W1, W3 (or W2, W4) in the same machining apparatus, and for a workpiece which is required to be particularly strict in machining accuracy, it also becomes possible to cope with such a workpiece by using two kinds of machining units which respectively hold a cutting blade for rough machining and a cutting blade for finish machining.

Also in the third embodiment typically shown in FIGS. 1, 2, 9 and 10, at least one of the two machining units 90B holds the cutting blade 93a, 93b movably in a radial direction, and the apparatus further comprises an axial moving mechanism 14, 27 for moving the at least one of the two machining units 90B in the axial direction of the pair of unit holding arbors 25, 31 by the cooperation of the pair of unit holding arbors 25, 31 and a radial moving mechanism 33, 94 for moving the cutting blade 93a, 93b held by the at least one of the two machining units 90B in the radial direction of the pair of unit holding arbors 25, 31 through the rotational drive member 37 passing through the one of the unit holding arbors 31. Thus, like a conventional numerical control latch or turning machine, it is possible to move the cutting blade 93a, 93b in either of the axial and radial directions of the workpiece W, and hence, it can be realized to perform a turning on both interior side surfaces W3, W4 of the hollow workpiece W which extend radially at two axially spaced places.

Obviously, numerous further modifications and variations of the present invention are possible in light of the above teachings. It is therefore to be understood that within the scope of the appended claims, the present invention may be practiced otherwise than as specifically described herein.

What is claimed is:

1. An internal machining apparatus for machining an internal surface of a hollow workpiece, the apparatus comprising:
   a work head rotatably supporting a work spindle for rotationally driving the hollow workpiece;
   a foot stock provided to face the work head;
   a machining unit holding a cutting blade and configured to be inserted into the hollow workpiece;
   a pair of unit holding arbors respectively supported by the work head and the foot stock to advance and retract in an axial direction thereof and being capable of non-rotatably holding the machining unit inserted in the hollow workpiece at both sides thereof; and
   a turning mechanism configured to be supplied with a drive power transmitted through the interior of one of the unit holding arbors for turning the cutting blade held on the machining unit about an axis orthogonal to an axis of the unit holding arbors.

2. The internal machining apparatus as set forth in claim 1, further comprising:
a unit supply device configured to insert the machining unit gripped thereby into the hollow workpiece and to be evacuated with the machining unit remaining left in the hollow workpiece prior to a machining of the hollow workpiece.

3. The internal machining apparatus as set forth in claim 1, wherein:
the turning mechanism includes a rotational drive member rotatably received in the one of the unit holding arbors for supplying the drive power to the turning mechanism; and
the machining unit comprises:
a unit body configured to be non-rotatably held by the pair of unit holding arbors;
a turn center shaft supported in the unit body to be rotatable about the axis orthogonal to the axis of the unit holding arbors and holding the cutting blade; and
a driven member rotatably supported in the machining unit and being drivingly connectable with the rotational drive member for transmitting rotation of the rotational drive member to the turn center shaft.

4. The internal machining apparatus as set forth in claim 3, further comprising:
a unit supply device configured to insert the machining unit gripped thereby into the hollow workpiece and to be evacuated with the machining unit remaining left in the hollow workpiece prior to a machining of the hollow workpiece.

5. The internal machining apparatus as set forth in claim 1, wherein two machining units one of which is the machining unit defined in claim 1 and the other of which holds a different cutting blade are used and are inserted successively one at a time into the hollow workpiece to be used for the machining of the hollow workpiece.

6. The internal machining apparatus as set forth in claim 5, wherein the other machining unit holds the different cutting blade movably in a radial direction, the apparatus further comprising:
an axial moving mechanism for moving the other machining unit in the axial direction of the pair of unit holding arbors by the cooperation of the pair of unit holding arbors; and
a radial moving mechanism for moving the cutting blade held by the other machining unit in the radial direction of the pair of unit holding arbors when a drive power is supplied through a rotational drive member passing through the one of the unit holding arbors.

7. The internal machining apparatus as set forth in claim 6, further comprising:
a unit supply device configured to insert the two machining units gripped thereby successively one at a time into the hollow workpiece and to be evacuated with the inserted machining unit remaining left in the hollow workpiece prior to a machining of the hollow workpiece.

* * * * *